United States Patent
Shaheen et al.

(10) Patent No.: US 6,498,790 B1
(45) Date of Patent: Dec. 24, 2002

(54) TIME DIVISION MULTIPLE ACCESS CELLULAR SYSTEM SUPPORTING PACKET DATA TRANSMISSIONS ON RECONFIGURABLE PACKET DATA CHANNELS AND METHOD OF OPERATION

(75) Inventors: Kamel M. Shaheen, Plano, TX (US); Akbar Rahman, Ottawa (CA); Chenhong Huang, Plano, TX (US)

(73) Assignee: Nortel Networks Ltd., St. Laurent (CA)

( * ) Notice: Subject to any disclaimer, the term of this patent is extended or adjusted under 35 U.S.C. 154(b) by 0 days.

(21) Appl. No.: 09/157,717

(22) Filed: Sep. 21, 1998

Related U.S. Application Data
(60) Provisional application No. 60/069,260, filed on Dec. 11, 1997.

(51) Int. Cl.[7] ............................................. H04B 7/212
(52) U.S. Cl. ..................................... 370/347; 370/442
(58) Field of Search ................................ 370/347, 328, 370/329, 330, 336, 337, 338, 341, 345, 352, 355, 356, 437, 442, 458, 468, 498, 310.2, 312, 314, 321, 326; 455/450, 452, 455, 464, 509, 511, 516

(56) References Cited

U.S. PATENT DOCUMENTS 5,729,534 A * 3/1998 Jokinen et al. ............. 370/280
5,802,465 A * 9/1998 Hamalainen et al. ........ 455/407
5,920,547 A * 7/1999 Werth ......................... 370/280
6,047,187 A * 4/2000 Haartsen ..................... 455/450
6,157,839 A * 12/2000 Cerwall et al. ............. 455/450

* cited by examiner

Primary Examiner—Douglas Olms
Assistant Examiner—Phirin Sam
(74) Attorney, Agent, or Firm—Bruce Garlick; James Harrison (57) ABSTRACT

A time division multiple access cellular communication system supports a packet channel is alterable between a packet control channel configuration and a packet traffic channel configuration. In the packet control channel configuration, the packet channel may provide only control functions or a combination of control and traffic functions. The packet channel may also be configured in a packet traffic configuration so that the packet channel provides only packet traffic functions. In this configuration, another packet channel must be configured in the packet control channel configuration to provide control functions for the packet traffic only packet channel. A Digital Control Channel (DCCH) includes information relating to a Beacon Packet Control Channel (PCCH), which contains information on the allocated packet channels. The subscriber unit initiates its packet data operations within the system. When packet data operations are reconfigured, the Beacon PCCH information is altered and the subscriber unit may obtain the new configuration information from the Beacon PCCH.

32 Claims, 6 Drawing Sheets

TIME DIVISION MULTIPLE ACCESS CELLULAR SYSTEM SUPPORTING PACKET DATA TRANSMISSIONS ON RECONFIGURABLE PACKET DATA CHANNELS AND METHOD OF OPERATION

CROSS-REFERENCE TO RELATED APPLICATION

The present application claims priority pursuant to 35 U.S.C. Sec. 119(e) to U.S. Provisional Application Ser. No. 60/069,260, filed Dec. 11, 1997, pending, which is hereby incorporated herein by reference in its entirety.

BACKGROUND

1. Technical Field

The present invention relates generally to wireless communication systems; and more particularly to a Time Division Multiple Access (TDMA) wireless communication system that supports packet data transmissions as well as voice communications. In this wireless system, TDMA radio frequency (RF) channels that support packet data operation can be alterable between three different configurations; a dedicated control only configuration, a combination of control and traffic configuration, and a traffic only configuration. Depending upon the packet data traffic loading within a particular cell and the overall system traffic model, a plurality of packet data channels with different configurations may be dynamically allocated to support packet data communications throughout the system.

2. Related art

Wireless communication systems are well known in the art to facilitate communication between a wireless subscriber unit and other wireless subscriber units as well as between wireless subscriber units and users of wired units, such as those attached to the public switched telephone network. Depending on a particular implementation, a wireless communication system operates according to a communication protocol within a frequency band and on particular RF channels contained within the frequency band. Frequency bands currently in use in North America and around the world for wireless communications include the 800 MHz (cellular) band and the 1900 MHz (PCS) band among others.

Various communication protocols have been developed to standardize wireless communication systems. These communication protocols include, for example, the Advanced Mobile Phone Service (AMPS) standards, the Global Standards for Mobility (GSM), the Code Division Multiple Access (CDMA) and the TDMA standard. These standards provide the technical requirements that form the compatibility standard for cellular and PCS mobile telecommunication systems. These wireless communication systems were initially developed to support voice communications. However, with the advances in digital computers and data networking technologies, and the need to provide wireless data services in mobile environment, it has become advantageous to develop wireless communication systems that also support data communication between mobile data terminals (e.g., portable computers).

Some wireless data communication networks, such as the Cellular Digital Packet Data (CDPD) network, have been developed specifically to service packet data communications using existing 30 kHz analog RF channels. However, CDPD protocol has been developed as a stand-alone infrastructure independent of the existing wireless voice communication networks. Creating a completely separate network for data communication requires great redundancy in resources on the network side and on the subscriber side. The voice/data user has to subscribe to two different services, two different networks, and two sets of equipment. Thus, it is advantageous to retrofit existing wireless communication systems that operate according to a standardized air interface protocol (e.g., TDMA) to support packet data communications and provide both services using a single subscriber unit. However, retrofitting existing wireless communication systems to support both voice and packet data communications is difficult, especially considering the different networking protocols and different traffic patterns for packet data communication as compared to voice communications.

Considering the networking difficulties, the two networks (CDPD network and TDMA network) can have a common interface between the Mobile Switching Center (MSC) and the functionality of the Mobile Data Intermediate System (MD-IS) through a Gateway MSC (GMSC). The GMSC shall provide an interface between the two systems in order to track the Voice/Data terminal roaming between both networks. Considering the different traffic patterns for data services as compared to voice services and its impact on the channel configuration, voice service usually requires a relatively longer holding time for each transaction. Therefore, two channel configurations are used to optimally operate such services. The channel can be configured as a control channel, or as a voice traffic channel. The control channel (DCCH) handles paging, registration, access requests, access response, and channel assignment activities. Also, DCCH can handle some Short Message Services (SMS) Control messages sent over the control channel configuration are usually short and bursty while voice conversations which always takes place over the traffic channel have extended channel utilization. Mobile stations initiate calls on the DCCH and thereafter assigned to a traffic channel for the duration of the call. This particular channel configuration allows for the control channel to have enough bandwidth to continue serving the existing population of idle mobile stations while the traffic channel is busy providing a dedicated communication link.

Similar channel configuration can be useful in certain cases of packet data communication systems. However, similar to the nature of voice services this Control-Only and Traffic Only (COTO) channel configurations are most suitable for longer holding time, where the traffic channel is usually occupied for relatively long period of time (e.g., 60–90 sec). This COTO channel configuration would be optimal in case of transferring large data files. Also, it would be best suited for higher traffic areas where a control only channel is needed to handle the excessive number of new arrivals.

However, in case of low-to-medium traffic areas and/or short and bursty data traffic environments, the optimal solution is a channel configuration that can provide control functionality and traffic facilities. In existing systems, both traffic patterns exist and one channel configuration is usually not the optimal solution all the time.

Thus, there exists a need in the art for a wireless communication systems that efficiently allocates resources to optimally support packet data communications, that compensates for expansion and contraction of packet data traffic loading and that may be easily deployed within existing wireless communication system that supports voice communications.

SUMMARY OF THE INVENTION

Thus, in order to overcome the shortcomings related to CDPD communication system described above, as well as other shortcomings and limitation of the fixed channel configuration scheme depicted in typical wireless communication systems, a TDMA communication system constructed according to the present invention efficiently services both voice and data communications by configuring and reconfiguring data channels in response to subscriber loading characteristics. The system includes at least one base station that supports the TDMA voice and data communication services on a plurality of RF channels. At least one of these plurality of TDMA channels is a packet data channel that supports TDMA packet data transmissions. According to the present invention, the TDMA channels can be used either for voice or for data purposes. Furthermore, the TDMA packet data channel is alterable between a packet control only channel configuration, packet control and traffic channel configuration, and a packet traffic channel configuration.

When configured in the control only channel configuration, the packet data channel provides control functions, such as paging, registration, access requests, access response, and channel assignment, and facilities for random based access. When in the control and traffic channel configuration, the packet data channel provides control functions as well as traffic (data transfer) facilities. Both random and reservation based accesses are allowed in this mode of operation. When in traffic only configuration, the packet data channel provides traffic only functions (reservation based access). In system deployment, control only channel configuration requires at least an additional packet control channel operating in traffic only channel configuration. However, traffic only configuration can operate with either control only channel configuration, or control and traffic channel configuration. The control and traffic channel configuration can operate as the minimum requirement for initial deployment of packet data systems. Multiple packet data channels can operate independently using the control and traffic channel configurations.

Several deployment scenarios are feasible for packet data systems. Based on the data traffic model, one can decide the optimal deployment scenario. For the initial deployment, where packet data traffic is expected to be light, the control and traffic channel configuration is the optimal scenario. As traffic loads increases, additional channels of the same configuration can be added where the N channels can operate either independently or collectively. Also, the channel configuration of the packet data channel can dynamically adjusted to any valid deployment scenario. Valid deployment scenarios include (1) one control only channel and N traffic only channels; (2) one control and traffic channel and N traffic only channels; (3) N control and traffic channels; and (4) N control and traffic channels and M traffic only channel, where N and M are greater then zero.

Based on the message size and the initial channel configuration, the Medium Access Controller (MAC) of the packet control channel can decide whether to allow the data terminal to continue its transmission on the same TDMA packet channel or to off-load the terminal into a packet traffic only channel. This functionality allows for the optimal deployment of the TDMA packet data system. Also, allocating and configuring multiple packet channels allows the resident system to be expanded to service data traffic as it increases within the system. Further, deallocating packet channels when packet traffic decreases allows valuable system resources to be conserved.

A typical construction of the system would include multiple base stations coupled by a network infrastructure. A network infrastructure in the typical construction would include the functions of CDPD network entities such as base station controller that couples the radio to at least one switching center. The switching center may then couple to one or more data networks, and one or more voice networks. The data networks may support packet data transmissions between data terminals coupled to the system and data terminals coupled to the data networks. One such data network that may be coupled to the switching center is the Internet.

In TDMA systems supporting packet data operation, a subscriber unit has no prior knowledge of the configuration of the packet channel supported by the system. Thus, the subscriber unit listens to the broadcast channel (BCCH) on the Digital Control Channel (DCCH) supported by the TDMA voice system. The broadcast information includes the availability of the packet data services and includes the location of the Beacon Packet Control Channel (PCCH). Upon receiving this information, the subscriber unit tunes to, and listens to the broadcast information on the Beacon PCCH which contains information on the number and the locations of the packet data control channels. Based on this information, the subscriber unit initiates its packet data hatching operation within the system and start listening to a particular packet data control channel. When the packet data channel (system) is reconfigured, the broadcast information on the Beacon PCCH as well as the other PCCH are altered and the subscriber unit may obtain the new configuration from the Beacon PCCH.

As system loading and packet data transmission requirements change, the system may reallocate resources that service packet data communications. For example, during increased loading periods, additional packet data channels may be allocated for data traffic purposes. Of these, one or two packet channels may be used for control purposes while the rest of the channels may be configured for traffic only. Further, as packet data loading decreases or when reallocation is required for other system conditions, packet data channels may be de-allocated and/or reconfigured considering the changes in system conditions.

Moreover, other aspects of the present invention will become apparent with further reference to the drawings and specifications which follow.

DETAILED DESCRIPTION OF THE DRAWINGS

Figure 1:
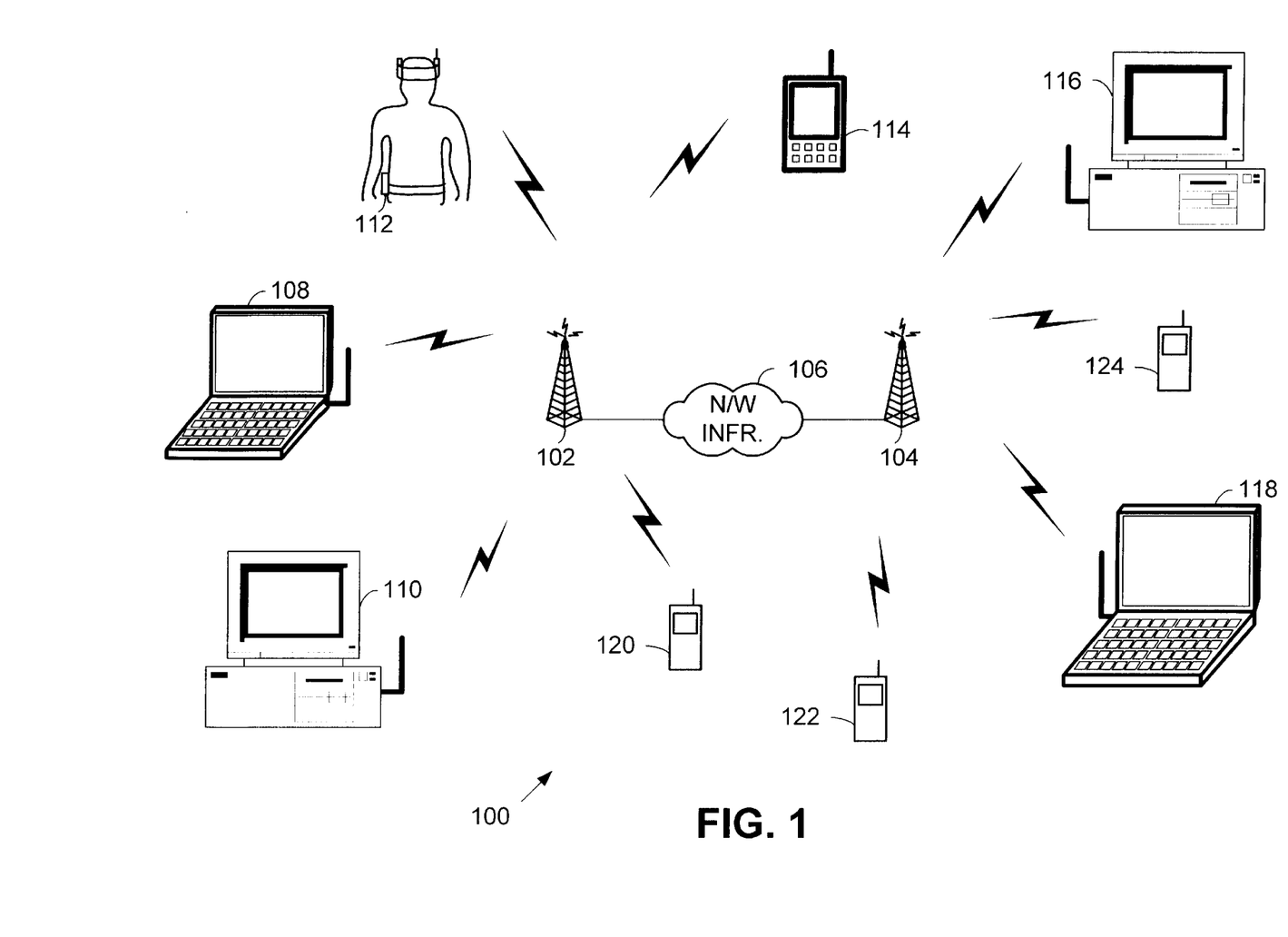
FIG. 1 is a system diagram illustrating a plurality of base stations and a network infrastructure constructed according to the present invention that provide both voice and packet data service within a respective service area.

FIG. 1 illustrates a time division multiple access (TDMA) cellular communication system 100 constructed according to the present invention. The communication system 100 includes base stations 102 and 104 that are coupled by a network infrastructure 106. In combination, the base stations 102 and 104 provide wireless service within a respective service area. As will be appreciated, in another construction of the communication system 100, additional base stations may be coupled to the network infrastructure, such base stations spaced about geographically to provide wireless service within a respective service area. Such constructions are generally known and will be described herein only to expand upon the teachings of the present invention.

Each of the base stations 102 and 104 supports TDMA communications on a plurality of channels within a respective cell. The plurality of channels typically reside within a designated bandwidth, such designated bandwidth in the 800 MHz or 1900 MHz range, for example, in North American operations. The system 100 may operate in a fashion compatible with an industry standard protocol, such as the IS-136 standard, for example. However, in addition to supporting voice communications, on the plurality of channels, the system 100 also supports packet data communications. Packet data communications, as compared to voice communications contain binary data that is operated upon in its binary format instead of being converted into an analog audio signal, as is the case with voice communications.

Subscriber units supported by the communication system 100 include voice-only subscriber units 120, 122 and 124, each of which may be supported according to existing operations under a standard protocol, such as the IS-136 standard. However, to facilitate the packet data communications, certain overhead messages that are received by the voice-only subscriber units 120, 122 and 124 may be modified. These modifications are ignored by the voice-only subscriber units 120, 122 and 124 so that they are serviced by the system 100 without modification.

In providing packet data communications, the communication system 100 supports devices that function primarily other than for voice communications. For example, laptop computers 108 and 118 as well as desktop computers 110 and 116 function primarily as data processing devices that operate upon binary data and require communications with other computers. In communicating other computers, the computers 108 through 118 communicate via packet data communications according to the present invention. As secondary functions, the computers 108, 110, 116 and 118 may also service voice communications using same or similar equipment as is included in the voice-only subscriber units 120, 122 and 124. Data terminal 114 provides data capture and processing functions but typically does not support voice communications. Wearable computer 112 may provide both voice and data processing functions. Thus, according to the present invention, the communication system 100 supports packet data communications with devices 108 through 118.

In configuring the system 100, resources are allocated based upon loading requirements, among other consideration. Loading requirements for voice communications are different, but may be related to, the loading requirements for packet data communications. Lightly loaded cells may be lightly loaded for both voice communications and packet data communications due to a relatively low number of users accessing the system 100 within the particular cell. However, as the number of users within a given cell increase, loading patterns for voice communications and packet data communications may vary in relationship to one another. In any case, as loading changes, channels must be allocated and deallocated so that sufficient resources, but not an excess of resources are allocated to support the load. In making these allocations and deallocations, available channels, frequency reuse among cells within the service area and other factors are employed in determining which channels to assign to which base stations 102 or 104.

Each of the base stations 102 and 104 is capable of altering a configuration of a channel between a voice channel and a packet channel. Further, each of the base stations 102 and 104 is capable of altering a configuration of a packet channel between a packet control channel configuration and a packet traffic channel configuration. In the packet control channel configuration, two sub-configurations are supported. In a control-only sub-configuration, the packet channel serves only to provide control functions. Such an allocation would typically only be made when additional packet channels operate in the packet traffic channel configuration. In a control and data sub-configuration, the packet channel provides control functions as well as data transmission functions. In a packet control channel configuration, the packet control channel may include a broadcasting sub-channel upon which information regarding the packet channel(s) is broadcast. Finally, in the packet traffic channel configuration, the packet channel serves only to carry packet data.

Since multiple packet channels may be allocated, allocation rules are established to guarantee functionality and compatibility among the allocated packet channels. Because of the control requirements for packet data transmissions, at least one packet channel must provide control functions. Thus, it is not possible for a single packet channel to be allocated that possesses a packet traffic channel configuration. When at least one packet channel is allocated as a packet traffic channel configuration, at least one complementary packet channel must be allocated in the packet control channel configuration, either as a control-only sub-configuration or a control and data sub-configuration. However, multiple packet channels may be allocated as packet control channels with the control and data sub-configuration. Further, multiple packet channels may be allocated in the packet traffic channel configuration, each of which is served by a single packet channel allocated in the packet control channel configuration.

As will be further described with reference to FIGS. 3A–3F, the structures of the packet channel in the various configurations complement one another. Using a similar construction of the various configurations of the packet channel allows subscriber units to detect the configuration of the packet channel(s) and operate accordingly in any configuration without requiring the subscriber units to recognize different frame sizes and other differences that could exist without a similar in construction. Thus, packet channels may be allocated and deallocated based upon system loading requirements to provide adequate resources for packet data transmissions but not to over allocate a limited resource of channels.

Figure 2:
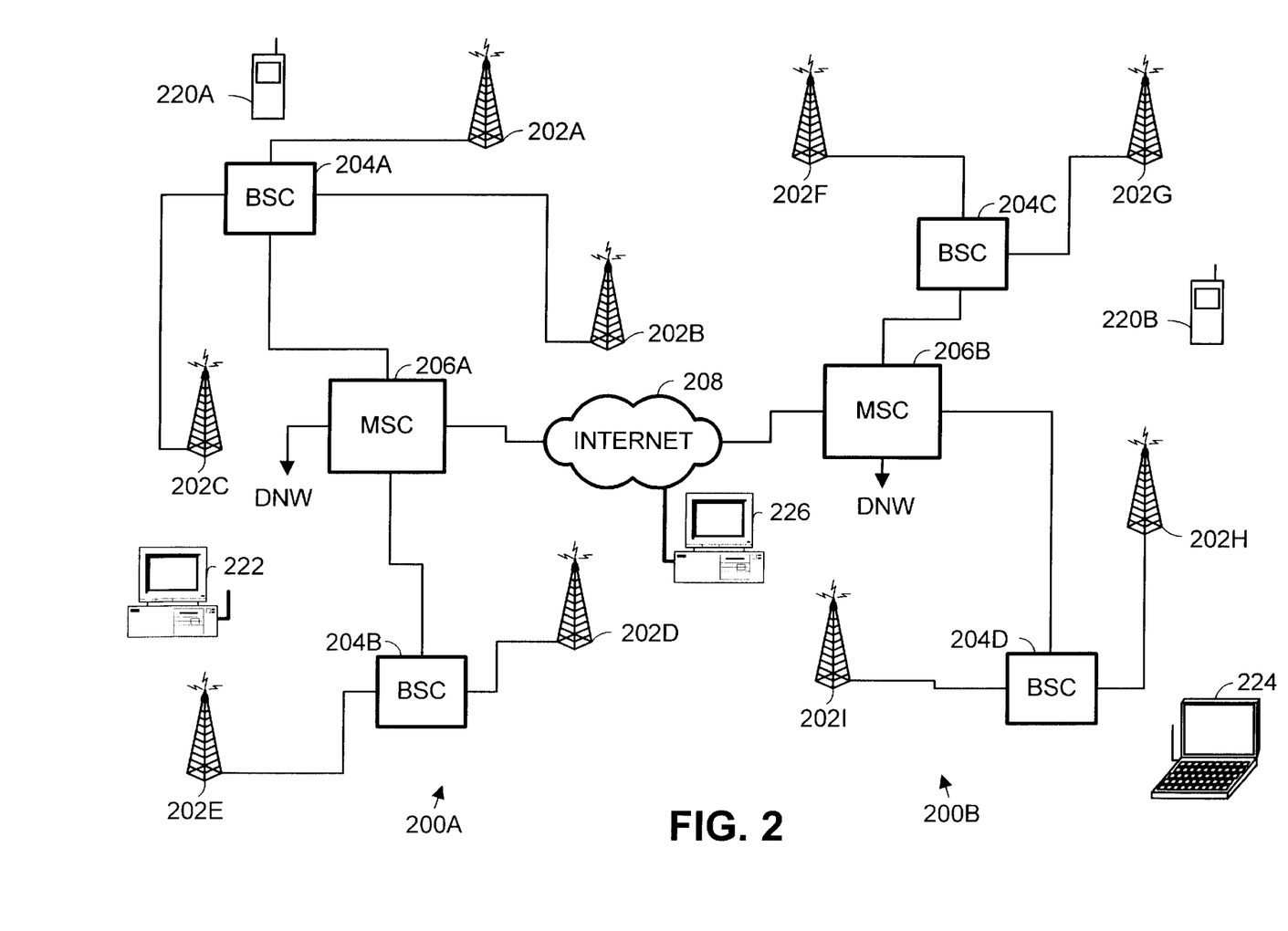
FIG. 2 is a system diagram illustrating an example of construction of a wireless communication system according to the present invention.

FIG. 1B illustrates a more detailed construction of a cellular system constructed according to the present invention. The cellular system includes two distinct networks 200A and 200B coupled by the Internet 208 at respective mobile switching centers 206A and 206B. Of course, the MSCs 206A and 206B would also be coupled to one another by a service provider network, the public switched telephone network (PSTN, not shown) or another communication network.

The first network 200A includes the MSC 206A, base station controllers (BSCs) 204A and 204B and base stations 202A, 202B, 202C, 202D and 202E. The second network 200B includes the MSC 206B, BSCs 204C and 204D and base stations 202F, 202G, 202H and 202I. The first network 200A and the second network 200B, therefore, provide service within distinct service areas. These distinct service areas may reside adjacent one another or may reside a distance apart. In any case, the networks 200A and 200B facilitate both voice and packet data communications for both stationary and roaming subscriber units.

Voice-only subscriber units 220A and 220B subscriber units are serviced within both service area. Further, computers 222 and 224 are provided with packet data service within both service areas as well, and may also be provided with voice service if the computers 222 and 224 support voice communications. While computer 222 may be stationary, receiving packet data local loop service, computer 224 may roam throughout either distinct service area.

In supporting packet data communications, the base stations 202A–204H provide a wireless link to the supported subscriber unit. For example, assume that base station 202C supports packet data communications with computer 222. The base station 202C supports all packet data communications between itself and the computer 222. The base station 202C, the BSC 204B and MSC 206A serve to route the packet data communications to other subscriber units served by the first network 200A, to the Internet 208 or via another communication path (such as a dedicated system operator network or another coupled network) to still another destination. When the first network 200A supports TCP/IP communications (or another packet based communication protocol) between the computer 222 and an Internet Server 226, the first network 200A performs not only routing functions but may also provide packet data manipulation and reformatting.

In operation, each base station broadcasts a digital control channel (DCCH) which provides operating and overhead information for the respective base station. Contained in the DCCH is overhead information that points each listening subscriber unit seeking packet data services to a Beacon packet control channel (PCCH). Such information may be indicated as neighbors by the DCCH Neighbor List in the IS-136 protocol, for example. Those subscriber units that are seeking packet data services tune to the Beacon PCCH for overhead information relating to packet data operations. Contained in the Beacon PCCH is information relating to additional PCCHs, if any. If more than one PCCH is available, the subscriber unit may use a hashing algorithm to select an available PCCH as its Assigned PCCH. If the only PCCH is the Beacon PCCH, the subscriber unit selects the Beacon PCCH as its Assigned PCCH. Once the Assigned PCCH has been determined, the subscriber unit registers with the Assigned PCCH according to packet data operation according to specific mobility management rules.

While camped on its Assigned PCCH, the subscriber unit performs cell reselection measurements using the Neighbor List which it acquired while camped on the DCCH or on the Beacon PCCH. Information on the Beacon PCCH indicates whether neighbor PCCHs are also available to support packet data operations. When a cell reselection takes place, a subscriber unit first camps on a new DCCH and the process of selecting and camping on a PCCH is repeated. If a PCCH activity timer expires and a default mode is selected, the subscriber unit returns to the DCCH and enters the DCCH Camping state.

Figure 3A:
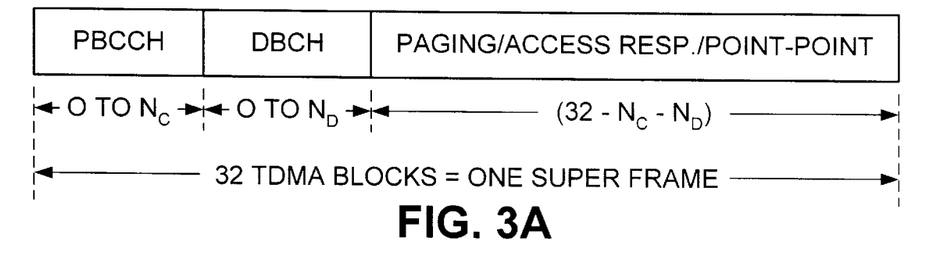
FIGS. 3A through 3F are diagrams illustrating the structure of packet data communications supported by a cellular system constructed according to the present invention.

FIG. 3A illustrates the structure of a superframe of a packet channel constructed according to the present invention. The superframe construction is common to each configuration of the packet channel, with variations based upon the differing operations of the packet channel and whether the packet channel is constructed in the packet control channel configuration or the packet traffic channel configuration. The packet traffic channel configuration may be considered as the packet control channel configuration without control and access opportunities.

As illustrated, the packet control channel includes 32 TDMA blocks, with the total length of the packet control channel equal to one Super Frame. The packet control channel may include a packet broadcast control channel (PBCCH) information which consumes a maximum of $N_c$ slots, a data broadcast channel (DBCH) information which consumes a maximum of $N_D$ slots. The data includes Paging data, Access Response data and Point to Point communication data.

In the packet control channel configuration, $N_c$ and $N_D$ are greater than zero since both the PBCCH and the DBCH include information that is broadcast to the subscriber units. In the control-only sub-configuration of the packet channel, the packet channel serves only to provide control functions, PBCCH and DBCH consume the packet control channel and the packet control channel includes no data. However, in a control and data sub-configuration, the packet channel provides control functions as well as data transmission functions. Thus, $N_C$ and $N_D$ are both greater than zero and the packet channel includes data. Finally, in the packet traffic channel configuration, the packet channel serves only to carry packet data, $N_C$ and $N_D$ are both zero and the data consumes the complete packet channel.

Figure 3B:
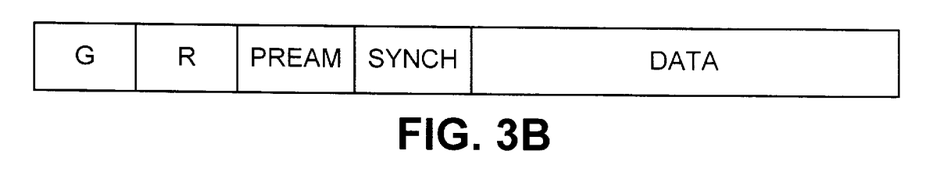

FIG. 3B illustrates a normal slot format for construction of slots in transmissions from a subscriber unit to a base station. As shown, the slot format includes a six bit guard field (G), a six bit ramp field (R), a sixteen bit preamble field (PREAM), a twenty-eight bit synch field (SYNCH) and a two-hundred-sixty-eight bit data field (DATA).

Figure 3C:
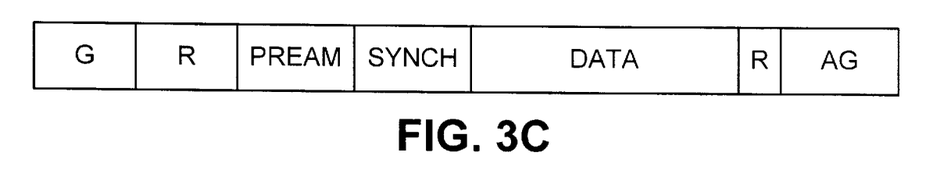

FIG. 3C illustrates an abbreviated slot format for construction of slots in transmissions from a subscriber unit to a base station. As shown, the slot format includes a six bit guard field (G), a six bit ramp field (R), a sixteen bit preamble field (PREAM), a twenty-eight bit synch field (SYNCH), a two-hundred-twenty-four bit data field (DATA) and a forty-four bit after guard field (AG).

Figure 3D:
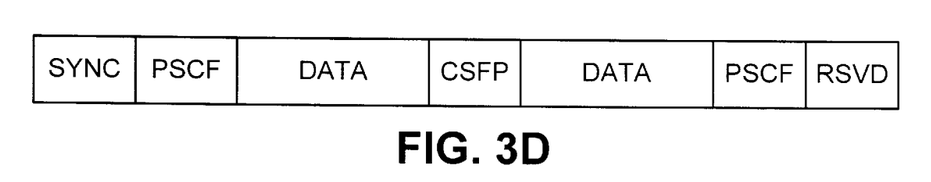

FIG. 3D illustrates a slot format for construction of slots of the packet channel in transmissions from a base station to a subscriber unit in the packet control channel configuration. As shown, the slot format includes a twenty-eight bit synch field (SYNCH), a twelve bit Packet Shared Channel Feedback field (PSCF), a one-hundred-thirty bit data sequence field (DATA), a twelve bit Coded Super Frame Phase field (CSFP), another one-hundred-thirty bit data sequence field (DATA), a ten bit PSCF field and a two bit reserved field.

Figure 3E:
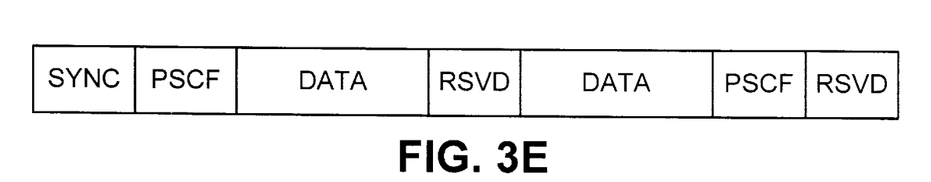

FIG. 3E illustrates a slot format for construction of slots of the packet channel in transmissions from a base station to a subscriber unit in the packet traffic channel configuration. As shown, the slot format includes a twenty-eight bit synch field (SYNCH), a twelve bit Packet Shared Channel Feedback field (PSCF), a one-hundred-thirty bit data sequence field (DATA), a twelve bit Reserved field (RSVD), another one-hundred-thirty bit data sequence field (DATA), a ten bit PSCF field and a two bit reserved field.

Figure 3F:
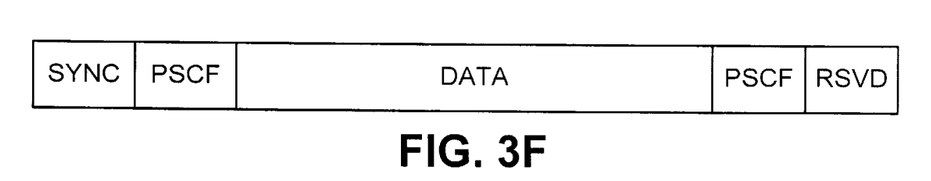

FIG. 3F illustrates an alternative slot format for construction of slots of the packet channel in transmissions from a base station to a subscriber unit in the packet traffic channel configuration. As shown, the slot format includes a twenty-eight bit synch field (SYNCH), a twelve bit Packet Shared Channel Feedback field (PSCF), a two-hundred-seventy-two bit data sequence field (DATA), a ten bit PSCF field and a two bit reserved field.

Figure 4:
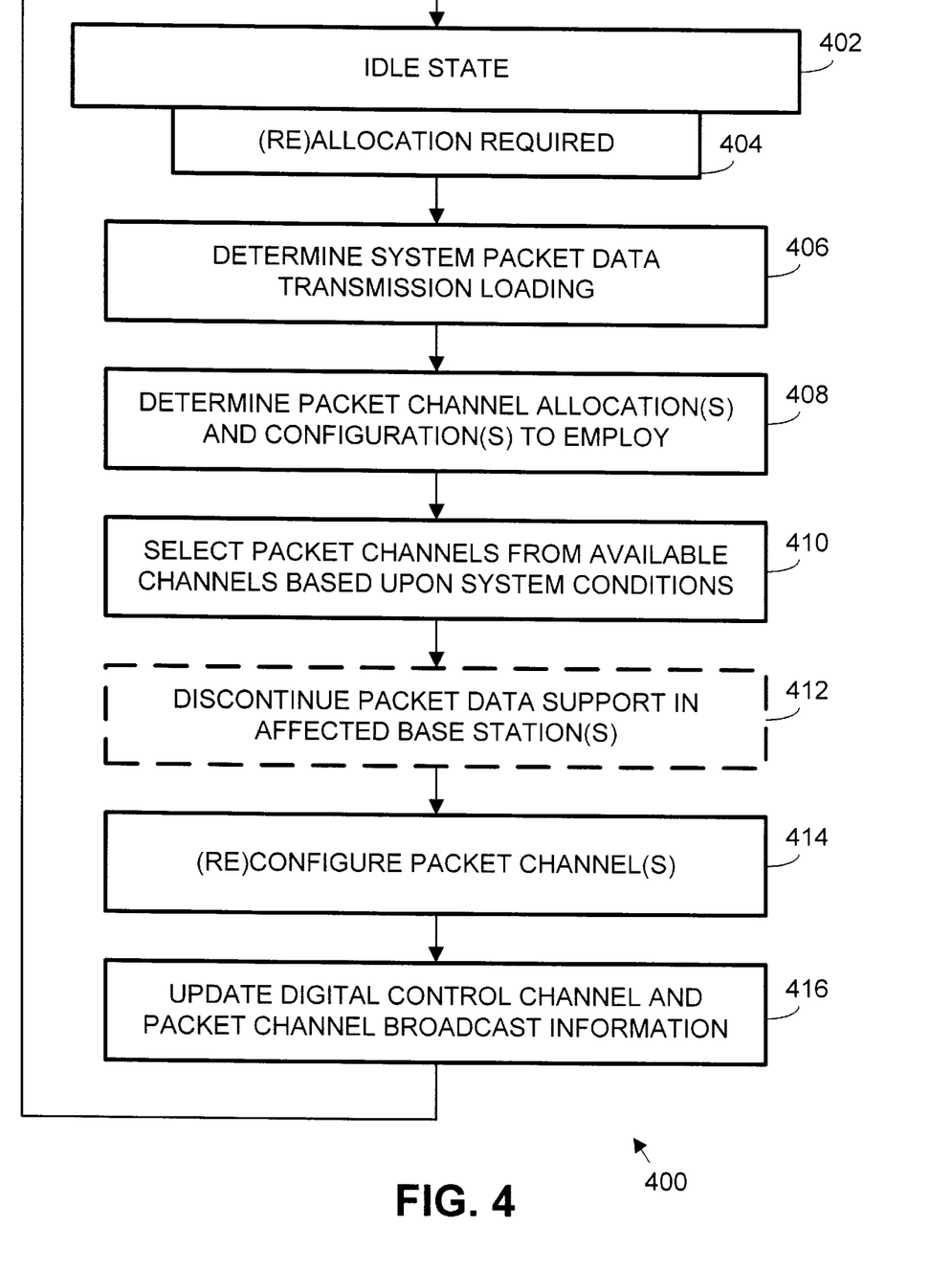
FIG. 4 is a logic diagram illustrating operation of a base station according to the present invention in configuring packet channels.

FIG. 4 is a logic diagram illustrating operation 400 of a base station or base stations according to the present invention in configuring packet channel(s). Because of system considerations that affect multiple base stations within the system, more than one base station may have its packet channels (re)configured during a single operation.

Operation commences at step 402 wherein the base station is in an idle state with respect to (re)allocation of the packet channel(s). When (re)allocation is required, operation proceeds through step 404 to step 406 where packet data transmission loading is determined for base stations that will be affected by the (re)allocation of packet channels. As was previously discussed, packet channels may be configured in packet control channel and packet traffic channel configurations. Further, the packet control channel configuration includes the control-only sub-configuration and the control and data sub-configuration. Thus, at step 408, based upon system loading and other considerations, it is determined the packet channel allocation(s) and configuration(s) to be employed in the (re)allocation. Additional considerations in such allocation and configuration include available channels, frequency reuse considerations and additional system considerations.

Next, at step 410, packet channels are selected from available channels based upon system conditions, frequency reuse patterns and additional consideration. Then, at optional step 412, packet data support is discontinued in affected base station(s). During a reallocation, one or more packet channels may be deallocated due to a decrease in packet data transmission requirements, because the channel is required to support voice communications or for other reasons. Should this be the case, all usage of the packet channel must be terminated so that the packet channel may be deallocated. Then, at step 414, affected packet channels that are to be allocated or reconfigured are (re)configured so that they may support the selected operation(s). Finally, at step 416, information contained in the DCCH and Broadcast PCCHs is updated to indicate the revised operation of the system. From step 416, operation proceeds to step 402.

Figure 5:
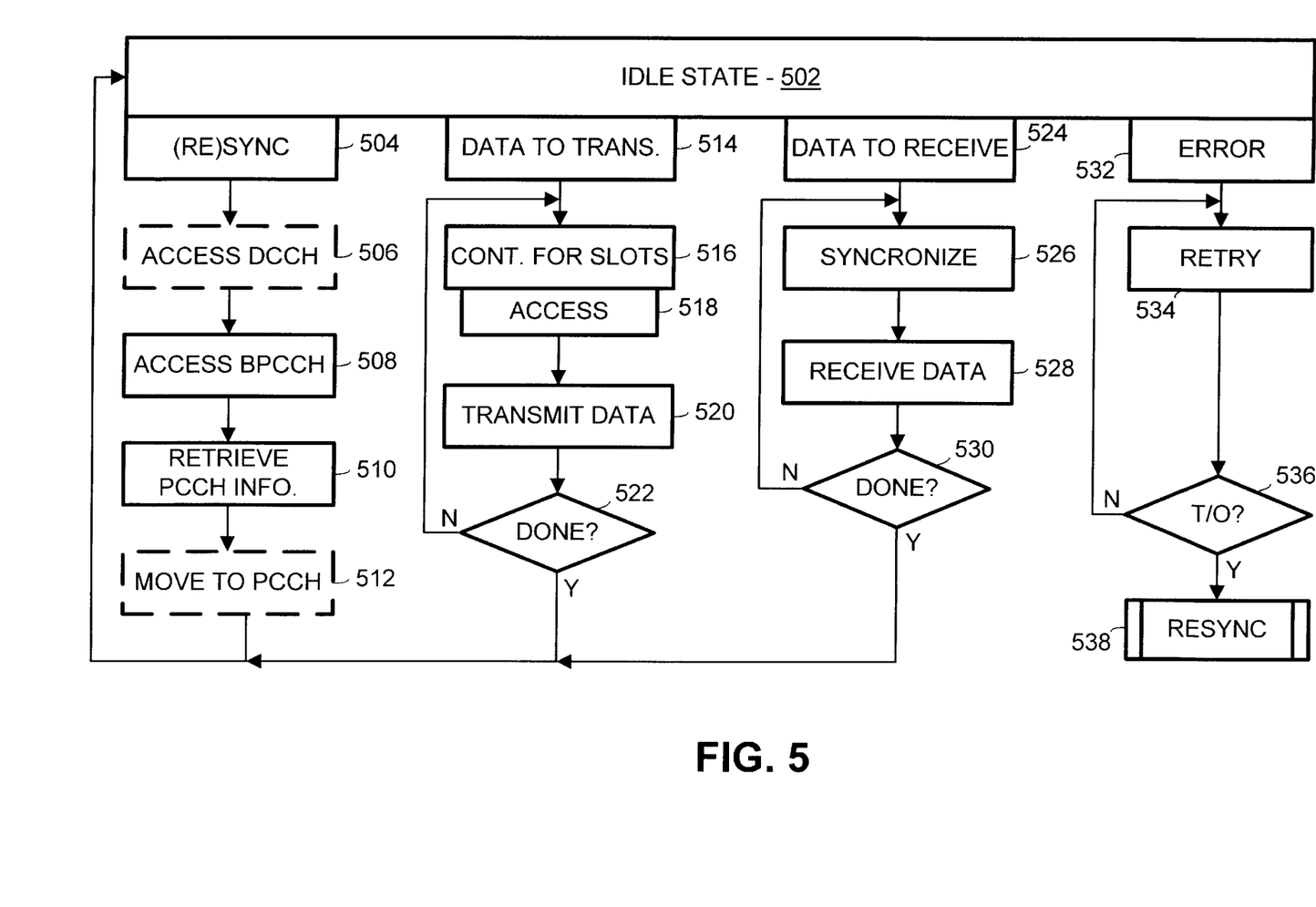
FIG. 5 is a logic diagram illustrating operation of a subscriber unit according to the present invention in communicating with at least one base station to transfer packet data.

FIG. 5 is a logic diagram illustrating operation of a subscriber unit according to the present invention in communicating with at least one base station to transfer packet data. Operation commences in an idle state 502 where the subscriber unit remains until operations commence. Should an initial synchronization or a resynchronization be required to set up packet data operations, operation passes through step 504 to optional step 506 wherein the subscriber unit camps on the DCCH. Typically, the subscriber unit will camp on the DCCH only at power on or during a resynch operation. Based upon the direction received in the DCCH, the subscriber unit accesses the Broadcast PCCH at step 508. However, if step 506 is not executed, operation proceeds directly from step 504 to step 508. Upon access of the Broadcast PCCH, the subscriber unit retrieves information relating to the PCCH at step 510. Should the Broadcast PCCH not be the Assigned PCCH for the subscriber unit (as determined based upon alternative PCCHs available and a hashing algorithm), the subscriber unit moves to its Assigned PCCH at optional step 512. From step 512, the subscriber unit reenters the idle state, awaiting packet data operations.

When the subscriber unit has packet data to transmit, operation proceeds via step 514 to step 516 wherein the subscriber unit contends for slots on the reverse link to a serving base station. When the slots are allocated at step 518, operation proceeds to step 520 wherein the subscriber unit transmits data to the serving base station. If the transmissions are not complete at step 522, operation proceeds again to step 516 wherein the subscriber unit contends for additional slots on the reverse link. However, in some operations, the subscriber unit may be allocated slots on the reverse link until the subscriber unit releases the slots. When all data has been transmitted to the base station, operation proceeds from step 522 to the idle state 502.

While listening to its Assigned PCCH, the subscriber unit may determine that the base station has packet data awaiting transmission to the subscriber unit. When such is the case, operation proceeds through step 524 to step 526 wherein the subscriber unit synchronizes its operation to an allocated packet channel upon which the packet data will be transmitted to the subscriber unit. When the data is transmitted, the subscriber unit receives the data at step 528. If the data receipt operation is complete, as determined at step 530, operation proceeds to step 502. However, if the data receipt operation is not complete, operation proceeds to step 526.

When an error occurs in any packet data operation, operation proceeds via step 532 to step 534 where the operation producing the error is retried. Such retry efforts will continue unit a time-out condition occurs at step 536. When such time-out condition occurs without successful completion of the operation producing the error, step 538 directs the subscriber unit to resynchronize to the packet channel operations in place. Thus, operation is directed from step 538 to step 504.

Figure 6:
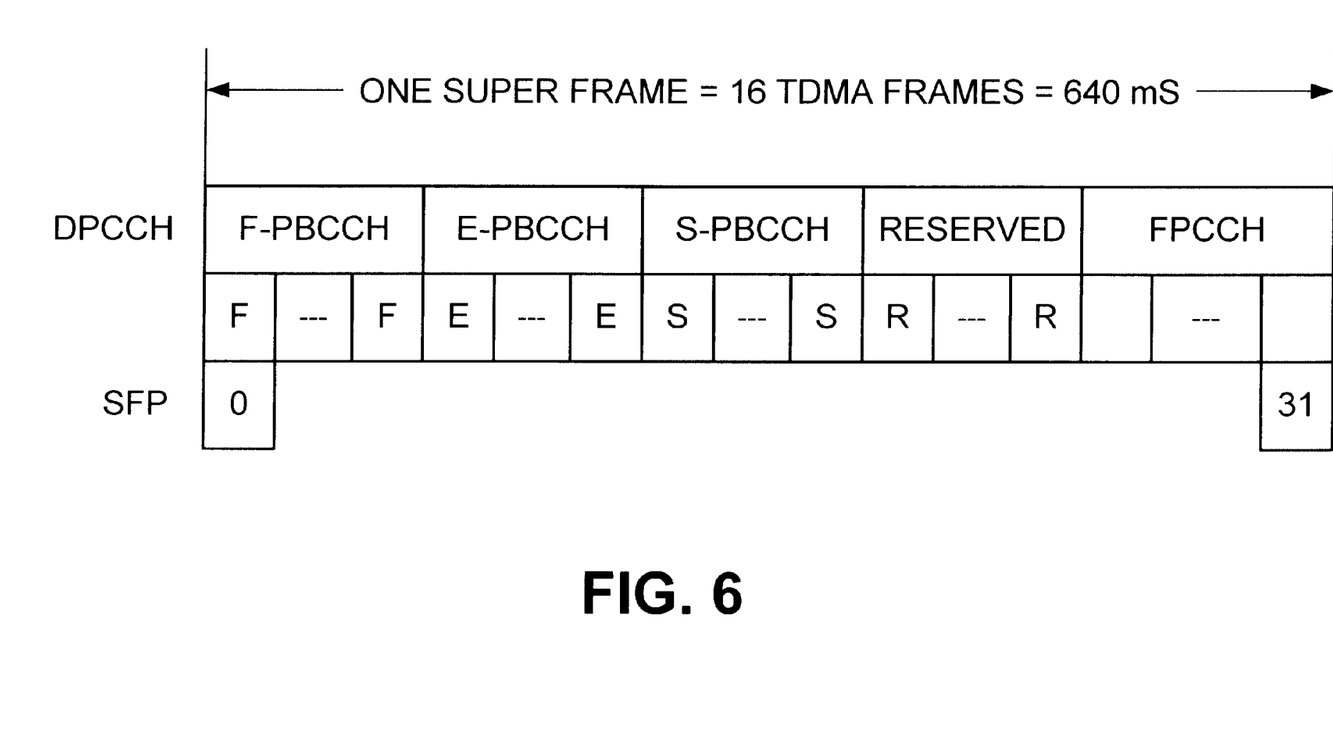
FIG. 6 is a diagram illustrating construction of a packet data superframe that supports multiple data transfer rates for packet data communications.

FIG. 6 is a diagram illustrating construction of a packet data superframe that supports multiple data transfer rates. In order to provide Sleep mode on a Dedicated PCCH, a Superframe (SF) structure is defined. The total number of slots per superframe is 32. A Super Frame Pointer (SFP) increments every TDMA block. SFP start at 0, increments for every TDMA block and counts modulo 32. The first slot in a SF (SFP =0) is allocated to the Fast Packet Broadcasts Control Channel (F-PBCCH).

If a Double-Rate Dedicated PCCH or Triple-Rate Dedicated PCCH is allocated on a given frequency, the start of the SFs must occur in the same TDMA block (i.e., SF synchronization is required). A frequency carrying both DCCH and Dedicated PCCH shall have their SF synchronized. A multi-rate PCCH operates on a single channel frequency and is subdivided into two categories: Primary PCCH, and Supplementary PCCH. A Primary PCCH is a full-rate channel and is the only PCCH on a multi-rate PCCH that carries the F-PBCCH, an Extended Packet Broadcasts Control Channel (E-PBCCH), a Short Message Service Packet Broadcast Control Channel (S-PBCCH) and possibly a Reserved channel. The Supplementary PCCH is comprised of all slots on a multi-rate PCCH which are not part of the Primary PCCH and therefore do not carry PBCCH information. The possible allocation of Primary and Supplementary PCCH are given in Table 1. It should be noted that mobile stations determine their Assigned PCCH (i.e., paging slot) on a Primary PCCH only. Supplementary PCCHs do not support paging slots. Each superframe on the Primary PCCH is comprised of an ordered sequence of logical channels as shown in FIG. 6. The number of slots on a PCCH that can be supported for each logical channel is as shown in Table 1. In Table 1, allocations are also shown for the Forward Broadcast Packet Control Channel (FPCCH) which is used for traffic and paging control.

TABLE 1

Slot Allocations

|  | Primary PCCH | | Supplementary PCCH | |
| --- | --- | --- | --- | --- |
|  | Min | Max | Min | Max |
| F-PBCCH (F) | 0 | 10 | 0 | 0 |
| E-PBCCH (E) | 0 | 8 | 0 | 0 |
| S-PBCCH (S) | 0 | 15 | 0 | 0 |
| Reserved (R) | 0 | 7 | 0 | 0 |
| FPCCH | 0 | 32 − (F + E + S + R) | 32 | 32 |

In view of the above detailed description of the present invention and associated drawings, other modifications and variations will now become apparent to those skilled in the art. It should also be apparent that such other modifications and variations may be effected without departing from the spirit and scope of the present invention as set forth in the claims which follow.

What is claimed is:

1. A time division multiple access cellular communication system comprising:
   at least one base station supporting time division multiple access communications on a plurality of forward link channels;
   at least one of the plurality of forward link channels comprising a packet channel that supports time division multiple access packet data transmissions; and
   a configuration of the packet channel alterable between a packet control channel configuration and a packet traffic channel configuration;
   wherein when configured in the packet control channel configuration, the packet channel carries at least control packets;
   wherein when configured in the packet traffic channel configuration, the packet channel carries only data packets; and
   wherein the packet channel is configured in one of the packet control channel configuration and the packet traffic channel configuration based upon respective operational requirements.

2. The wireless communication system of claim 1, the packet channel carrying only control packets when in the packet control channel configuration.

3. The wireless communication system of claim 1, the packet channel carrying both control packets and data packets when in the packet control channel configuration.

4. The wireless communication system of claim 1, further comprising a network infrastructure that couples to each base station.

5. The wireless communication system of claim 4, wherein the network infrastructure also couples to at least one data network.

6. The wireless communication system of claim 5, wherein the data network comprises the Internet.

7. The wireless communication system of claim 1, wherein the packet channel includes a forward link from a respective base station to a plurality of subscriber units.

8. The wireless communication system of claim 1, wherein information concerning the packet channel is contained within a digital control channel.

9. The wireless communication system of claim 1, wherein:
   a plurality of packet channels are supported by the base station;
   at least one of the plurality of packet channels is configured in the packet control channel configuration; and
   at least one of the plurality of packet channels is configured in the packet traffic channel configuration.

10. The wireless communication system of claim 1, wherein at least one of the plurality of forward link channels comprises a digital control channel supporting voice services and broadcasting the availability of packet data services.

11. The wireless communication system of claim 1, wherein one of the packet channels includes a broadcast sub-channel.

12. A method of operating a time division multiple access cellular communication system comprising:
   supporting time division multiple access communications on a plurality of forward link channels;
   allocating at least one of the plurality of forward link channels as a packet channel that supports time division multiple access packet data transmissions;
   altering a configuration of the packet channel between a packet control channel configuration and a packet traffic channel configuration;
   wherein when configured in the packet control channel configuration, the packet channel carries at least control packets;
   wherein when configured in the packet traffic channel configuration, the packet channel carries only data packets; and
   wherein the packet channel is configured in one of the packet control channel configuration and the packet traffic channel configuration based upon respective operational requirements.

13. The method of claim 12, further comprising configuring the packet channel to carry only control packets when in the packet control channel configuration.

14. The method of claim 12, further comprising configuring the packet channel to carry both control packets and data packets when in the packet control channel configuration.

15. The method of claim 12, further comprising routing packet data communications between a serving base station and a network infrastructure.

16. The method of claim 15, further comprising routing the packet data communications between the network infrastructure and at least one data network.

17. The method of claim 16, wherein the data network comprises the Internet.

18. The method of claim 12, wherein the packet channel resides upon a forward link from a serving base station to a subscriber unit.

19. The method of claim 12, further comprising transmitting information concerning the packet channel upon a digital control channel.

20. The method of claim 12, wherein:
   a plurality of packet channels are supported;
   at least one of the plurality of packet channels provides control functions is configured in the packet control channel configuration; and at least one of the plurality of packet channels is configured in the packet traffic channel configuration.

21. The method of claim 12, wherein at least one of the plurality of forward link channels comprises a digital control channel supporting voice services and broadcasting the availability of packet data services.

22. The method of claim 12, wherein one of the packet channels includes a broadcast sub-channel.

23. A method of operating a subscriber unit within a time division multiple access cellular communication system comprising:

listening to a digital control channel to receive information regarding a broadcast packet control channel;

listening to the broadcast packet control channel to obtain information regarding configuration of the broadcast packet control channel and other allocated packet channels;

determining an allocated packet control channel based upon contents of the broadcast packet control channel;

determining a configuration of at least one packet channel, wherein the configuration of the packet channel may be a packet control channel configuration or a packet traffic channel configuration;

wherein when configured in the packet control channel configuration, the packet channel carries at least control packets;

wherein when configured in the packet traffic channel configuration, the packet channel carries only data packets; and wherein the packet channel is configured in one of the packet control channel configuration and the packet traffic channel configuration based upon respective operational requirements; and exchanging packet data with the cellular communication system based upon the configuration of the packet channel.

24. The method of claim 23, wherein when the packet channel is in the packet control channel configuration, the packet channel carries only control packets.

25. The method of claim 23, wherein when the packet channel is in the packet control channel configuration, the packet channel carries both control packets and data packets.

26. A time division multiple access cellular communication system comprising:

a base station supporting time division multiple access communications on a plurality of channels;

the base station configuring a first group of the plurality of channels as control only packet channels that support the control of time division multiple access packet data transmissions;

the base station configuring a second group of the plurality of channels as control and data packet channels that support the control of time division multiple access packet data transmissions and the transmission of packet data;

the base station configuring a third group of the plurality of channels as traffic only packet channels that support the transmission of packet data transmission; and the base station configuring the first, second and third group of the plurality of channels based upon packet data loading and packet data user patterns.

27. The wireless communication system of claim 26, further comprising a network infrastructure that couples to the base station.

28. The wireless communication system of claim 27, wherein the network infrastructure also couples to at least one data network.

29. The wireless communication system of claim 28, wherein the data network comprises the Internet.

30. The wireless communication system of claim 26, wherein information concerning the first, second and third group of the plurality of channels is contained within a digital control channel.

31. The wireless communication system of claim 26, wherein at least one of the plurality of channels comprises a digital control channel supporting voice services and broadcasting the availability of packet data services.

32. The wireless communication system of claim 26, wherein one of the packet channels includes a broadcast sub-channel.